No. 635,159. Patented Oct. 17, 1899.
E. THOMSON.
ELECTRIC METER.
(Application filed Sept. 10, 1897.)
(No Model.)
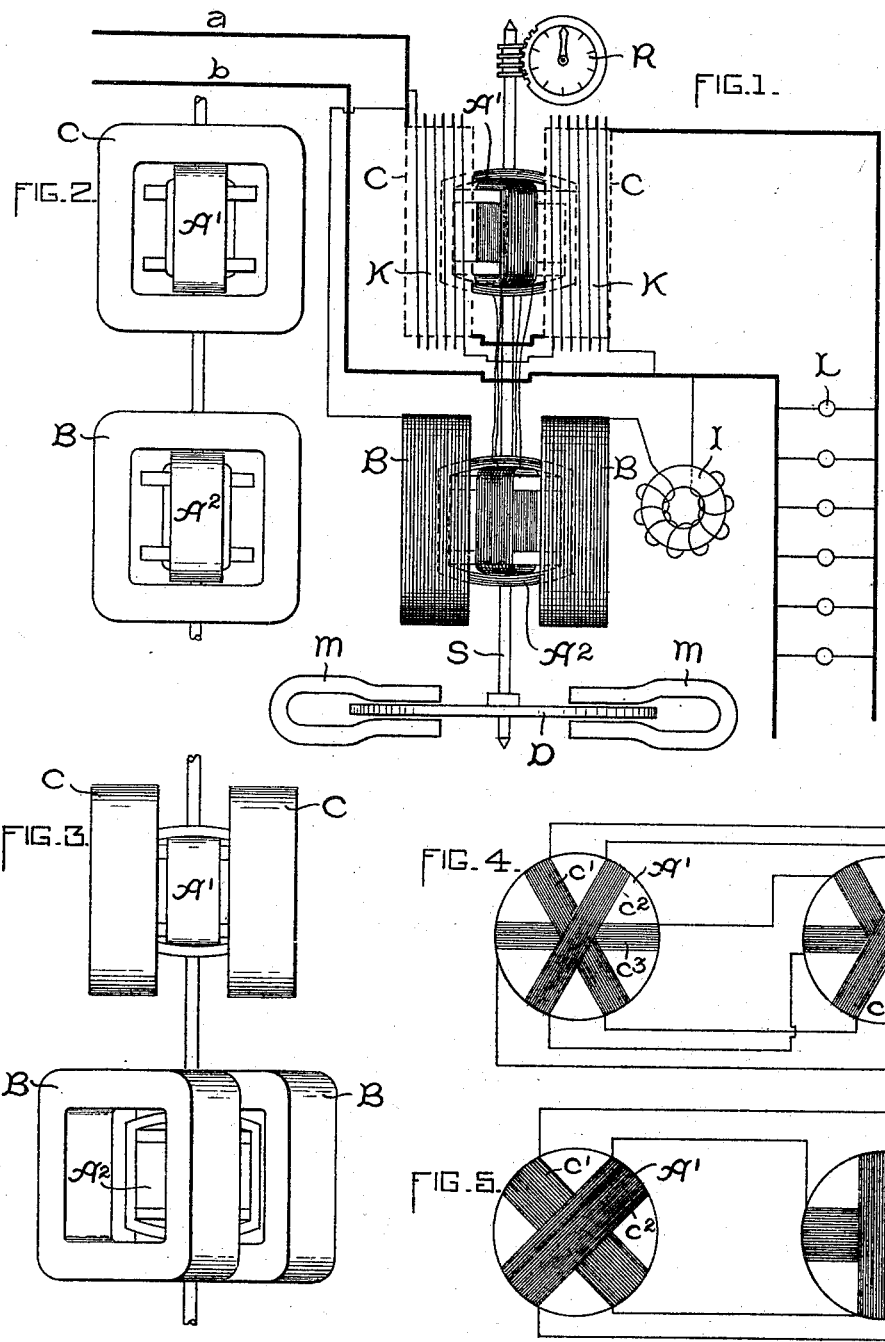
Witnesses—
A. F. Macdonald.
John W. Pittney.
Inventor—
Elihu Thomson, by
Geo. R. Blodgett,
Atty.

UNITED STATES PATENT OFFICE.

ELIHU THOMSON, OF SWAMPSCOTT, MASSACHUSETTS, ASSIGNOR TO THE GENERAL ELECTRIC COMPANY, OF NEW YORK.

ELECTRIC METER.

SPECIFICATION forming part of Letters Patent No. 635,159, dated October 17, 1899.

Application filed September 10, 1897. Serial No. 651,213. (No model.)

*To all whom it may concern:*

Be it known that I, ELIHU THOMSON, a citizen of the United States, residing at Swampscott, in the county of Essex, State of Massachusetts, have invented certain new and useful Improvements in Electric Meters, (Case No. 627,) of which the following is a specification.

My invention relates to electric meters, and more particularly to those which are used with alternating current and operated by induced currents, the armature having no direct connection with the mains.

It has for its object to provide a simple meter of reasonable accuracy which will be easily and cheaply made.

The essential features of the meter consist of a current-coil and a potential-coil, each acting upon its own armature, the two armatures being so arranged as to impart motion to a single shaft and having their windings displaced relatively to one another or the fields being so displaced and the coils of the armatures being parallel, it being manifest that this would be a substantially equivalent arrangement. The coils on the armatures are, by preference, electrically connected. I may, if preferred, increase the inherent displacement of phase between the currents in the shunt and series coils by any well-known device. Any suitable counting device or register and damping mechanism may be employed.

The accompanying drawings show my invention.

Figure 1 is a diagrammatic elevation showing the meter connected in circuit. Figs. 2 and 3 are side elevations showing two different arrangements operating on substantially the same principles. Figs. 4 and 5 show alternative methods of winding the armatures.

In Fig. 1 the current-coil C is connected in one of the mains $a\ b$. The potential-coil B, of fine wire and many turns, is connected across the mains, and in series with it I prefer to place an inductive coil I, serving to further displace the phase between the current in the shunt-coil and that in the main circuit. A starting-coil K is connected in parallel across the mains and is arranged to be substantially coincident in plane with the current-coil. The starting-coil is of just sufficient effect to counterbalance the friction of the meter, and thus increase its accuracy on small loads where friction is not negligible. Lamps L represent any form of translating device. A disk D, of copper or other good conducting metal, revolves as a damping mechanism between the magnets M M. Other equivalent forms of damper might be used.

$A'\ A^2$ are the armatures of the meter, located upon the shaft S. They might be geared to the shaft without departing from my invention, and many different mechanical arrangements to this end might be made. These expedients are well known in meter construction and need not be illustrated or more fully described.

The windings of the two armatures are illustrated in Figs. 4 and 5. These windings are interconnected, the wires passing near the shaft, as shown in the figure, and forming what might be called a "polyphase transmission" between the armatures. In Fig. 4 the arrangement is shown as consisting of coils $c'\ c^2\ c^3$. The coils in Fig. 4 are wound in parallel planes, but are so interconnected that they are electrically displaced from one another—that is, the plane of the coil $c'$ on armature $A'$ is displaced from the plane of the coil $c'$ on armature $A^2$ by an angle of sixty degrees or by an angle of one hundred and twenty degrees, depending upon the direction in which the angle is measured. The arrangement in Fig. 5 might also be adopted where two phases only are employed, and this is in some respects simpler than that shown in Fig. 1. In this case the coils are displaced from one another forty-five degrees in plane.

In Figs. 2 and 3 I show the mechanical disposition of the field-magnet coils and armatures, Fig. 2 showing the arrangement of Fig. 4. In this figure the parts are lettered as before, the field-coils C and B being in parallel planes and the displacement of the armatures being effected by the connection of the windings, as in Fig. 4. As an alternative construction I may adopt that shown in Fig. 3, in which the field-coils C and B are displaced in plane, so that their flux cuts the armatures at different angles. In this case, as already intimated, the armatures themselves may, if desired, be wound with their coils in parallel planes.

The operation of the meter is as follows: If the coil A' be in its plane of maximum induction—that is, parallel with the current-coil C—the armature A² will have its coils at an angle with the field-coil B. In this case the current in C induces in A' an electromotive force which sends current through the closed circuit of the two armatures, they being close-circuited through each other. The coils on A² being at an angle with the plane of the coils B tend to move. When the coils on A' are by this rotation turned out of inductive relation to the coil C, the coils on A² have come into position of greatest induction with the coils B, sending current through the winding of A', causing it to rotate. This rotation of the shaft S is communicated to the counting device R, giving a substantial indication of the energy or watts derived from the mains $a\ b$.

What I claim as new, and desire to secure by Letters Patent of the United States, is—

1. An induction-wattmeter for alternating currents, comprising a current-coil, a potential-coil of phase displaced from that of the current-coil, and two armatures upon the same shaft coacting to impart torque thereto and respectively within the fields of the current and potential coils.

2. An induction-wattmeter for alternating-current circuits, comprising a current-coil in series in the work-circuit, a potential-coil in shunt to the work-circuit, and two armatures upon the same shaft having windings electrically connected, but displaced relatively to one another.

3. An induction-wattmeter for alternating-current circuits, comprising a current-coil in series in the work-circuit, a potential-coil in shunt across the work-circuit, with means for increasing the displacement of phase between the electromotive force and current, and a pair of armatures disposed respectively within the fields of the current and potential coils and coacting to impart torque to the shaft.

4. An induction-wattmeter for alternating-current circuits, comprising a current-coil, a potential-coil of phase displaced from the current-coil, and two armatures respectively within the field of the current and shunt coil, the windings of the armatures electrically connected and angularly displaced from one another.

5. In an electric wattmeter, the combination of current and potential coils generating independent fields of force, with two armatures disposed upon the same shaft and respectively situated in the fields of force of the two coils.

6. In an electric meter, the combination of a rotatable closed conductor, a current-coil and a potential-coil with their magnetic axes in the same plane, both coils being located in proximity to said conductor and arranged so that when one coil acts inductively upon said conductor, the other acts dynamically.

7. An induction-meter having an induced member, a current-coil, a potential-coil and a starting-coil, the magnetic axes of the current-coil and potential-coil being in substantially the same plane.

8. In an electric meter, the combination of a rotatable closed conductor, current and potential coils with their magnetic axes in substantially the same plane, the closed conductor being located in proximity to said coils and so arranged that the portions of the conductor acted upon by the respective coils are angularly displaced from each other.

9. In an electric meter, the combination of a rotatable closed conductor, and current and potential coils with their magnetic axes in substantially the same plane, and located in proximity to said closed conductor, the closed conductor being provided with paths for current so arranged that current induced by one of said coils is acted upon dynamically by another coil.

10. In an electric meter, the combination of a rotatable closed conductor, and current and potential coils acting on said conductor and arranged so that the respective magnetomotive forces produced thereby act upon the conductor through paths substantially parallel with each other.

11. In an electric meter, the combination of a rotatable closed conductor, and current and potential coils acting on said conductor and arranged so that the respective magnetomotive forces produced thereby act upon the conductor through paths substantially parallel with each other, while the currents induced in said conductor are constrained to follow paths asymmetrical with respect to said coils.

In witness whereof I have hereunto set my hand this 4th day of September, 1897.

ELIHU THOMSON.

Witnesses:
JOHN W. GIBBONEY,
HENRY O. WESTENDARF.